United States Patent

Nobata

[11] 3,952,639
[45] Apr. 27, 1976

[54] LOUVER ASSEMBLY

[76] Inventor: Tetsuo Nobata, c/o Universal Climb Co., Ltd., 6-6, Horita-dori, Mizuho, Nagoya, Aichi, Japan

[22] Filed: Dec. 30, 1974

[21] Appl. No.: 537,419

[30] Foreign Application Priority Data

Sept. 26, 1974 Japan.............................. 49-115934

[52] U.S. Cl......................................... 98/110; 98/2; 98/40 VM; 98/41 R; 98/121 A
[51] Int. Cl.²............................................ F24F 7/00
[58] Field of Search............. 98/121, 40 VM, 40 V, 98/40 C, 114, 2, 2.11, 2.16, 112, 110, 41 R, 40 A; 49/77, 78, 81, 74

[56] References Cited
UNITED STATES PATENTS

| | | | |
|---|---|---|---|
| 3,354,808 | 11/1967 | Macrow | 98/40 C |
| 3,636,854 | 1/1972 | Cary | 98/110 |
| 3,641,913 | 2/1972 | Dennis | 98/110 X |
| 3,680,470 | 8/1972 | Neece | 98/110 |
| 3,683,787 | 8/1972 | Cary | 98/41 R X |

FOREIGN PATENTS OR APPLICATIONS

| | | | |
|---|---|---|---|
| 176,996 | 10/1961 | Sweden | 98/114 |
| 953,345 | 3/1964 | United Kingdom | 98/2 |

*Primary Examiner*—William F. O'Dea
*Assistant Examiner*—Harold Joyce
*Attorney, Agent, or Firm*—Wenderoth, Lind & Ponack

[57] ABSTRACT

A louver assembly including a closure member which is pivotably connected to the lower portion of a louver such that, in its operative position, it blocks the clearance defined between the inner surface of a bottom wall of a casing attached to an air blowoff outlet and underside of the louver, which is rotatably supported within the casing through shafts and, in its inoperative position, closes an opening of the casing.

3 Claims, 7 Drawing Figures

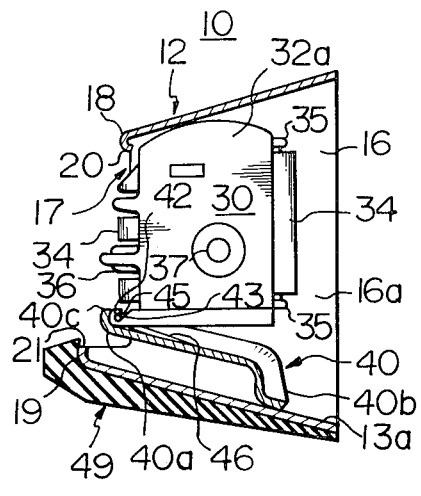

LOUVER ASSEMBLY

The present invention relates generally to a louver assembly attached to the air outlet of an internal unit of an air conditioning system installed in a motor vehicle and, more particularly, to a rotatable louver assembly.

A rotatable louver assembly of the type described above is provided as a common practice with a casing attached to the outlet end of the internal unit, and a louver supported within the casing so as to be rotatable about a horizontal axis such that, when an air conditioning apparatus associated with the louver assembly such as cooling or heating apparatus is not used, the louver is rotated about the horizontal axis thereby to block the air outlet with the louver's underside.

In order that the louver be rotatable within the casing, there should naturally be provided a clearance between the louver and the casing and a relatively large clearance is usually provided between underside of the louver and inner surface of the casing's bottom wall. With this arrangement, however, a part of the air blown out during use of the air conditioning apparatus is unwantedly allowed to pass through the large clearance and, as a consequence, difficulty is experienced in controlling, through the louver, the direction which the air is desired to be blown.

It is an object of the present invention to provide a rotatable louver assembly which effectively establishes air flows well-controlled in direction from the blowoff outlet of an internal unit of an air conditioning system installed in a motor vehicle, and is adapted to close the blowoff outlet when the system is not used.

Another object of the present invention is to provide a rotatable louver assembly which serves to reduce noises emanating from a blower accommodated in an air conditioning system of a motor vehicle.

A further object of the present invention is to provide a rotatable louver assembly attached to a blowoff outlet of an internal unit of an air-conditioning system for a motor vehicle and which can be assembled with ease.

The above and other objects and attendant advantages of the present invention will be more apparent to those skilled in the art from a reading of the following detailed description in conjunction with the accompanying drawings which show preferred embodiments of the invention for illustration purpose only, but not for limiting the scope of the same in any way.

FIG. 3 is a cross-sectional view of the assembly shown in FIG. 1 and held in its operative position;

FIG. 4 is a view similar to FIG. 3 but showing the assembly in its inoperative position;

FIG. 6 is a cross section illustrating a modified embodiment of the louver assembly according to the present invention; and FIG. 7 is a view similar to FIG. 6 but illustrating another modified embodiment of the louver assembly according to the present invention.

Figure 1:
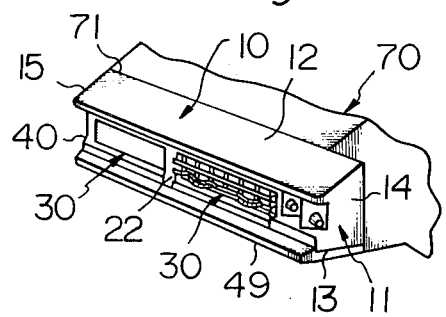
FIG. 1 is a perspective view of a preferred embodiment of the louver assembly according to the present invention which is mounted on the blowoff outlet of a cooling system incorporated in a motor vehicle.
Figure 2:
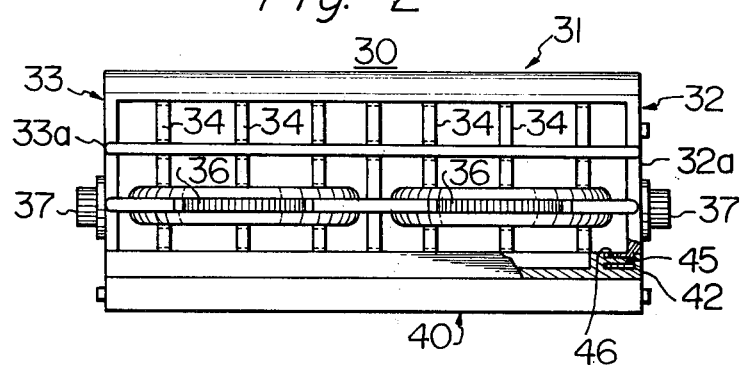
FIG. 2 is a partly cut-away section showing, in a front end view, a louver employed in the assembly illustrated in FIG. 1.

Referring to FIGS. 1 through 5, a preferred embodiment of the louver assembly according to the present invention is generally designated by reference numeral 10. The assembly 10 is shown in FIG. 1 as being attached to a blowoff outlet 71 of an internal unit 70 which is included in a cooling system of a motor vehicle.

The louver assembly 10 comprises a casing 11 fixed to the blowoff outlet 71 of rectangular form and a pair of louvers 30 supported within the casing 11 in a manner as will be described later. In FIG. 1, one of the louvers 30 is illustrated as being in use or in its operative position and the other out of use or in its inoperative position.

The casing 11 consists of a top wall 12, a bottom wall 13 and opposite end walls 14 and 15 which are associated together to define an air passage 16 having a rectangular opening 17.

The top and bottom walls 12 and 13 are inclined downwardly and upwardly, respectively, toward the opening 17 such that the air passage 16 has its cross-sectional area progressively reduced to the opening 17. Leading edges 18 and 19 of the top and bottom walls defining the opening 17 are curved to form retaining portions 20 and 21, respectively. The casing 11 is further provided with a partition wall 22 substantially in the laterally intermediate position to bisect the passage 16. On the end walls 14 and 15 and on opposite surfaces of the partition wall 22 are formed aligned holes (not shown) so as to rotatably support the louvers 30 through shafts.

Each of the louvers 30 thus rotatable in the bisected air passage 16a or 16b includes a mounting frame 31, six air-directing plates 34 disposed within the frame 31 at suitable intervals and rotatably supported by the frame 31, rods 35 for connecting the plates 34 together into two different groups, and a pair of actuating members 36 each of which is responsive to the orientation of the associated group of the plates 34.

To rotatably support the louvers 30 in the air passages 16a and 16b, supporting shafts 37 project from outer surfaces 32a and 33a of opposite end walls 32 and 33, respectively, of the mounting frame 31. The shafts 37 are adapted to be received in the aforementioned holes provided in the casing 11.

The louver 30 also comprises a closure member 40 which is pivotably mounted on the forward underside of the frame and shown in the drawings in the form of a plate.

Figure 5:
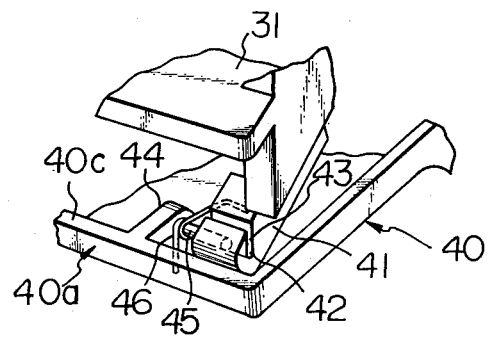
FIG. 5 is a fragmentary perspective view showing, in an enlarged scale, an arrangement for mounting a closure member.

As viewed in FIGS. 3 and 5, the pivotable closure member 40 assumes in use such a position that its rear marginal edge (leading end portion) 40b remains in contact with the inner surface 13a of the bottom wall 13 of the casing 11.

FIG. 5 illustrates means for pivotally mounting the forward end 40a of the closure member 40 on the forward underside of the frame 31.

The above-mentioned means includes a pair of supporting arms 41 which are formed integrally with the frame 31 to project from both sides of the forward underside thereof and provided with openings 42 therethrough. In each of the openings 42 a pivot shaft 45 is received which will be described later. The opening 42 is contiguous with an inclined slot 43 having a width which is appreciably smaller than the outside diameter of the pivot shaft 45 to thereby guide and position the pivot shaft in the opening 42. Although it may be needless to mention that the slot 43 can be provided with a perpendicular disposition instead of the angular one, however, the latter is more preferable to securely position the pivot shaft 45 in the opening 42.

The closure member 40, on the other hand, has integrally formed on both sides of its forward end 40a a pair of projections 44 which are positioned inwardly of the supporting arms 41. Each of the projections 44 serves to fixedly hold thereon the pivot shaft 45 retained in the opening of the supporting arm 41.

The pivotal mounting means further includes a spring 46 wound around the pivot shaft 45 while having its one end retained by the lower portion of the frame 31 and the other end by the forward edge 40c of the closure member 40. With this spring 46, the closure member 40 is constantly biased such that its rear edge 40b is brought into engagement with the inner surface of the bottom wall 13.

The louver assembly 10 also includes a protective covering 49 formed of soft plastics, rubber or the like and attached to the underside of the assembly 10 so that an occupant in the front seat may have his knees and legs protected from injuries which would otherwise be caused by hitting the louver assembly in the event of rocking, sudden stops and the like of the automobile.

The positional relationship between casing 11 and louver 30 of the assembly 10 under the operative condition is shown in FIG. 3 and under the inoperative condition is illustrated in FIG. 4. In use or the operative state, the closure member 40 has its rear end 40b urged into engagement with the inner surface 13a of the bottom wall 13 of the casing 11 with the result that the air flowing through the clearance defined between underside of the louver 30 and bottom wall 13 of the casing 11 is caused to pass through the louver 30. In the inoperative state, on the other hand, the louver 30 is rotated so as far that the closure member 40 blocks the opening 17 of the casing 11.

Another preferred embodiment of the louver assembly according to the present invention is illustrated in FIG. 6. The louver assembly generally designated by reference numeral 50 comprises in addition to parts and elements in the assembly 10 a layer 51 of foam rubber, plastic foam or the like on the inner surface 12a of the top wall 12 of the casing 11. Also included in the assembly 50 is a layer 52 similarly of foam rubber, plastic foam or the like which is provided to the inner surface 13a of the bottom wall 13 in order to provide more effective closure of the clearance defined between underside of the louver 30 and bottom wall 13 of the casing 11. Thus, for the sake of simplicity of description, parts and elements similar to those included in the louver assembly 10 are designated by like numerals.

With the provision of the blocking layers 51 and 52, the air is directed substantially through the louver 30 while there can be reduced noises accompanied by operations of blower, motor and others (not shown) of the automotive cooling system. The noises may be further reduced if such a blocking layer is provided to the inner surfaces of the casing 11.

Still another preferred embodiment of the louver assembly is illustrated in FIG. 7. The louver assembly generally designated by reference numeral 60 includes a closure member 61 which is a modification of the closure member 40 provided in the louver assembly 10 of the first embodiment and, thus, detailed description will be concerned only with modified parts and elements with like numerals given to like parts and elements.

The closure member 61 shown in FIG. 7 forms a part of the lower portion of the mounting frame 31. More specifically, the closure member 61 is shaped to have the same cross section as that of the rear marginal portion of the closure member 40 and is pivotably mounted on the lower portion of the frame 31.

In this case, the inclined slot 43 is opened to face the inner surface of the bottom wall 13 of the casing 11. The closure member 61 may be pivotably attached to the above-mentioned portion by any known means.

Furthermore, the closure member 61 may be so provided as to form the lower portion of the mounting frame 31. In this instance, the frame 31 should be provided in its lower portion with a beam portion (not shown) to thereby support lower ends of the air-directing plates 34.

It is preferable to further provide a stopper so that, in the operative state shown in FIG. 7, the closure member 61 may be prevented from performing any further pivotal motion in the clockwise direction. This will afford smoothness to the manipulation of the louver 30 from the operative position to the inoperative position or vice versa.

While several embodiments of the invention have been shown and described in detail, it will be understood that these are for the purpose of illustration only and is not to be taken as a definition of the scope of the invention, reference being had for this purpose to the appended claims.

What is claimed is:

1. A louver assembly for attachment to the airflow outlet of an air conditioner system, said assembly comprising:
    a casing surrounding said airflow outlet and having at least one airflow opening;
    adjustable louver means rotatably mounted to said casing within said airflow opening for rotation about a horizontal axis to adjust and direct the flow of air flowing out of the outlet; and
    closure means pivotally attached at one end to the lower portion of the louver means for movement with the rotation of the louver means and cooperating with the lower wall of the casing, for blocking the flow of air under the louver and forcing the air to exit from the outlet only through the louver means, and for completely closing the airflow opening when the louver means is rotated upward.

2. A louver assembly as claimed in claim 1, wherein said closure means forms at least a portion of the underside of the louver means.

3. A louver assembly as claimed in claim 1, further comprising biasing means surrounding said closure means at the end attached to said louver means for biasing the unattached end of said closure means away from the louver means and against the casing surrounding the airflow outlet.

* * * * *